(12) United States Patent
Nie (10) Patent No.: US 11,429,671 B2
(45) Date of Patent: Aug. 30, 2022

(54) PARSER FOR PARSING A USER AGENT STRING

(71) Applicant: MICROSOFT TECHNOLOGY LICENSING, LLC, Redmond, WA (US)

(72) Inventor: Qianqian Nie, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 314 days.

(21) Appl. No.: 16/616,330

(22) PCT Filed: May 25, 2017

(86) PCT No.: PCT/CN2017/085879
§ 371 (c)(1),
(2) Date: Nov. 22, 2019

(87) PCT Pub. No.: WO2018/214094
PCT Pub. Date: Nov. 29, 2018

(65) Prior Publication Data
US 2020/0159781 A1    May 21, 2020

(51) Int. Cl.
*G06F 17/00* (2019.01)
*G06F 16/903* (2019.01)
*G06N 20/00* (2019.01)
*G06N 5/04* (2006.01)

(52) U.S. Cl.
CPC ......... *G06F 16/90344* (2019.01); *G06N 5/04* (2013.01); *G06N 20/00* (2019.01)

(58) Field of Classification Search
CPC ..... G06F 16/90344; G06N 5/04; G06N 20/00
See application file for complete search history.

(56) References Cited

U.S. PATENT DOCUMENTS

| | | | |
|---|---|---|---|
| 8,655,337 B2 | 2/2014 | Sherlock et al. | |
| 9,015,657 B2 | 4/2015 | Akins et al. | |
| 9,356,821 B1 | 5/2016 | Jagannathan | |
| 9,547,727 B2 | 1/2017 | Passani et al. | |
| 10,805,377 B2* | 10/2020 | Grill | H04L 63/1425 |
| 2011/0185016 A1* | 7/2011 | Kandasamy | G06Q 30/02 709/203 |
| 2011/0314077 A1 | 12/2011 | Pala et al. | |
| 2012/0042067 A1 | 2/2012 | Gerstenfeld et al. | |

(Continued)

FOREIGN PATENT DOCUMENTS

| | | |
|---|---|---|
| CN | 101365190 A | 2/2009 |
| CN | 104283918 A | 1/2015 |

(Continued)

OTHER PUBLICATIONS

"First Office Action and Search Report Issued in Chinese Patent Application No. 201780054271.7", dated May 8, 2021, 12 Pages.

(Continued)

*Primary Examiner* — Greta L Robinson
(74) *Attorney, Agent, or Firm* — Workman Nydegger (57) ABSTRACT

The present disclosure provides a method for parsing a user agent string. Information is extracted from a user agent string based on user agent string patterns. The extracted information is mapped to predefined information based on patterns of the extracted information.

20 Claims, 5 Drawing Sheets

(56) References Cited

U.S. PATENT DOCUMENTS

2014/0052855 A1    2/2014  Motoyama et al.
2016/0350355 A1    12/2016  Zhu et al.
2016/0350400 A1*   12/2016  Zhu .......................... G06F 16/35

FOREIGN PATENT DOCUMENTS

| CN | 105704177 A | 6/2016 |
| CN | 105868240 A | 8/2016 |
| CN | 106330520 A | 1/2017 |
| CN | 106712986 A | 5/2017 |
| WO | 2016/082092 A1 | 6/2016 |

OTHER PUBLICATIONS

International Search Report and Written Opinion for PCT/CN2017/085879, dated Feb. 9, 2018.

Maier, et al., "NAT usage in Residential Broadband Networks", In Proceedings of International Conference on Passive and Active Network Measurement, Mar. 2011, 11 Pages.

* cited by examiner

PARSER FOR PARSING A USER AGENT STRING

This application is a U.S. National Stage Application of PCT/CN2017/085879, filed May 25, 2017, which application is hereby incorporated by reference. To the extent appropriate, a claim of priority is made to the above disclosed application.

BACKGROUND

A user agent is software that is acting on behalf of a user. When the user agent operates in a network protocol, it often identifies itself by submitting a characteristic identification string, called a user agent string, to an application server. The user agent string contains various identity information of the user agent, for example, application type, device information, operating system (OS), OS version, software vendor, software revision, browser, and browser version. The collection of such user agent information from the user agent strings makes it possible for the further process, such as identifying the characteristic of the user agent in real time, analyzing application log data in terms of use agents, or the like.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide a method for parsing a user agent string (UAS). Information is extracted from a user agent string based on user agent string patterns. The extracted information is mapped to predefined information based on patterns of the extracted information.

It should be appreciated that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Figure 1:
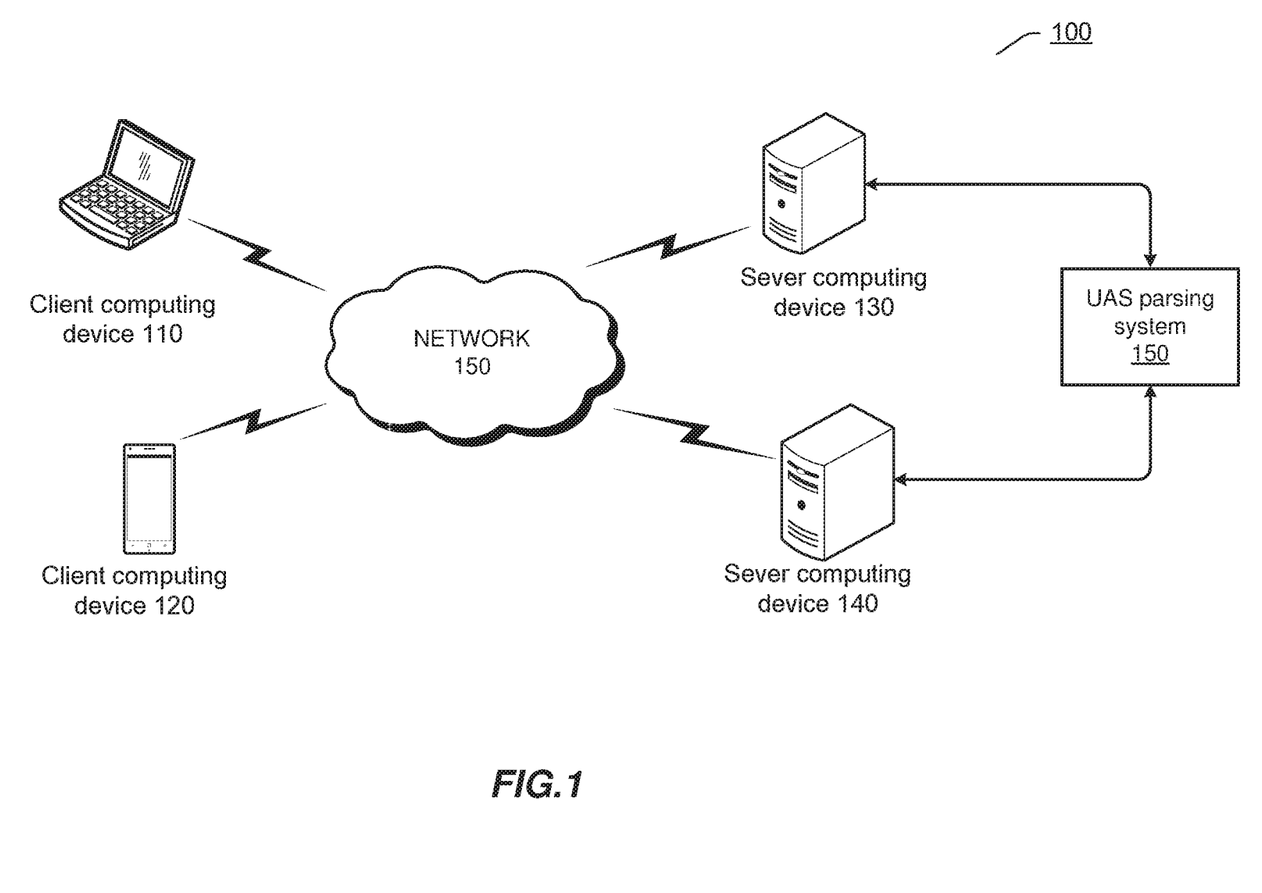
FIG. 1 illustrates an exemplary environment where the described techniques can be implemented according to an embodiment.

FIG. 1 illustrates an exemplary environment where embodiments of the disclosure can be implemented. It is to be appreciated that the structure and functionality of the environment are described only for the purpose of illustration without suggesting any limitations as to the scope of the disclosure. The disclosure can be embodied with a different structure or functionality.

The exemplary environment or system 100 includes a network 150. The network 150 may be implemented by means of one or more of various types of networks such as Local Area Networks (LAN), Wide Area Networks (WAN), wireless network, and so on, which are shown collectively as network 150.

Network 150 may include any of a variety of wireless sub-networks that may further overlay stand-alone ad-hoc networks, and the like, to provide an infrastructure-oriented connection for client devices such as devices 110, 120 and so on. Such sub-networks may include mesh networks, Wireless LAN (WLAN) networks, cellular networks, and the like. Network 150 may further include an autonomous system of terminals, gateways, routers, and the like connected by wireless radio links, and the like.

Network 150 is configured to connect one or more servers such as server computing devices 130, 140 and their respective components with other computing devices, such as client device 110, 120. Network 150 is enabled to employ any form of computer readable media for communicating information from one electronic device to another.

Client computing devices 110, 120 may include any device capable of receiving and sending a message over a network 150. Examples of client computing devices 110, 120 include cellular telephones, smart phones, radio frequency (RF) devices, music players, digital cameras, Personal Digital Assistants (PDAs), handheld computers, personal computers, laptop computers, wearable computers, tablet computers, automatic cars, integrated devices combining one or more of the preceding devices, or the like. One or more of client devices 110, 120 may also be configured to operate over a wired and/or a wireless network.

Client devices 110, 120 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), JavaScript Object Notation (JSON), or the like, to display and send information.

Client computing devices 110, 120 also may include a client application that is configured to send content to or receive content from another computing device, including, without limit, server computing devices 130, 140 or other client computing devices. The client application may include a capability to provide and receive textual content, multimedia information, or the like. The client application may further provide information that identifies itself, including a type, capability, name, or the like. Example of such information includes user agent strings.

Client computing devices 110, 120 may also be configured to communicate a message, such as through email, Short Message Service (SMS), Multimedia Message Service (MMS), instant messaging (IM), internet relay chat (IRC), Extensible Messaging and Presence Protocol (XMPP), or the like, to another computing device. However, the present disclosure is not limited to these message protocols, and virtually any other message protocol may be employed.

Client devices 110, 120 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 110, 120 may employ any of a variety of client applications to access content, read web pages, receive/send messages, or the like. For example, the user may employ a browser or other client application to access a web page hosted by a Web server implemented as server computing device 130 or 140.

A user agent string parsing system 150 may be connected to the server computing device 130 and 140. The user agent string parsing system 150 may be used to parsing user agent strings received by the server computing device 130 or 140 from various client applications at various client computing device 110 or 120. In an example, the user agent string parsing system 150 may obtain user agent information from the user agent string and provide the user agent information to the server computing device 130 or 140 in real time. In another example, the user agent string parsing system 150 may parse log data about user agent strings obtained from at least one of servicer computing device 130 and 140. The user agent information obtained by parsing the log data may be further used to analyze the behavior of the user agents. Although the user agent string parsing system is illustrated as a backend system for server computing device 130 and 140, it should be appreciated that more than one user agent string parsing system may be deployed in some implementations, and it should be appreciated that the user agent string parsing system may be implemented or incorporated in the server computing device 130 or 140 in some implementations.

Figure 2:
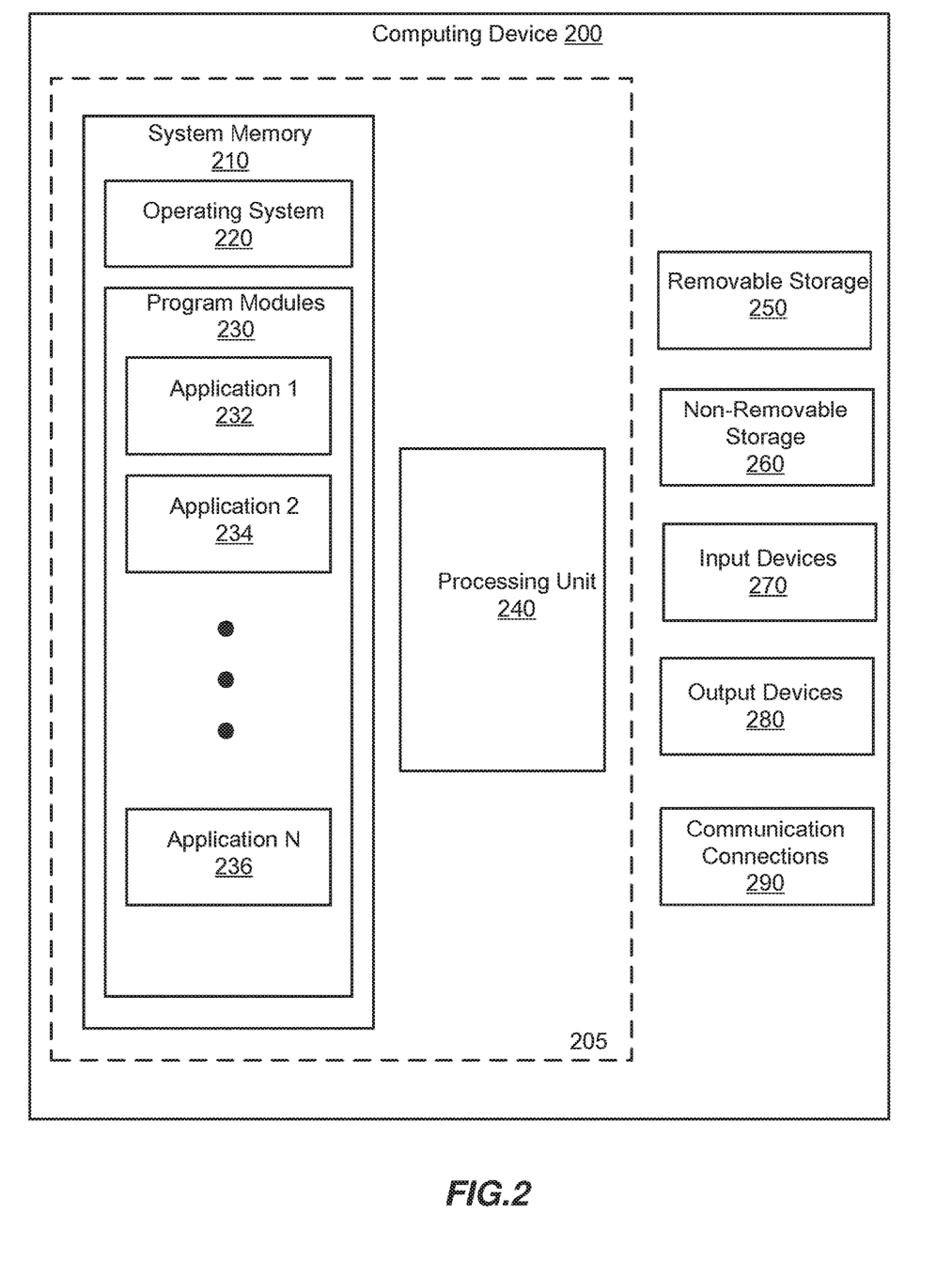
FIG. 2 illustrates an exemplary computing device according to an embodiment.

FIG. 2 is a block diagram illustrating exemplary physical components of a computing device 200 with which embodiments of the disclosure may be practiced. The computing device 200 may be one of the client computer device 110, 120 in some embodiments. The computing device 200 may be one of the server computer device 130, 140 in some embodiments. The computing device 200 may be user agent string parsing system 150 in some embodiments.

In a basic configuration, the computing device 200 includes a processing unit 240 and a system memory 210. The processing unit 240 may present at least one processor for software program execution in computing device 200.

The system memory 210 may comprise, but is not limited to, volatile storage (e.g., random access memory), non-volatile storage (e.g., read-only memory), flash memory, or any combination of such memories. The system memory 210 may include an operating system 220 and one or more program modules 230 suitable for running software applications 232-236. The operating system 220 may be suitable for controlling the operation of the computing device 200. Examples of the operating system 220 include a general-purpose operating system such as a version of UNIX, or LINUX, or a specialized client-side and/or mobile communication operating system such as Microsoft's Windows Phone, Google's Android, Apple's IOS, and so on. Embodiments of the disclosure may be practiced in conjunction with other operating systems, or any other application program and is not limited to any particular application or system.

This basic configuration is illustrated by those components within a dashed line 205. The computing device 200 may have additional features or functionality. For example, the computing device 200 may also include additional data storage devices (removable and/or non-removable) such as, for example, magnetic disks, optical disks, or tape. Such additional storage is illustrated by a removable storage device 250 and a non-removable storage device 260.

The computing device 200 may also have one or more input devices 270 such as a keyboard, a mouse, a pen, a sound input device, a touch input device, etc. The one or more output devices 280 such as a display, speakers, a printer, etc. may also be included. The aforementioned devices are examples and others may be used. The computing device 200 may include one or more communication connections 290 allowing communications with other computing devices such as the client computing device 110, 120 and the server computing device 130, 140 as shown in FIG. 1. Examples of suitable communication connections 290 include, but are not limited to, RF transmitter, receiver, and/or transceiver circuitry; universal serial bus (USB), parallel, and/or serial ports.

Various applications 232-236 may be executed on the processing unit 240 to provide information for users. Examples of such applications include, but not limit to, a browser program that is generally used to present content of a website, an instant messaging (IM) program that is generally used to implement instant communication among users, a multimedia player program that is generally used to play multimedia such as video, audio, or static image, a text processing program that is generally used to present various documents. The multimedia player program may be a client application that requests and presents online multimedia content from a multimedia server. The text processing program may be a client application that is used to provide online text processing service through communicating with a text processing server. As an example, some of the applications 232-236 may be a bundle of client applications to complete productivity tasks online, examples of the bundle of client applications include those such as Word, Excel, PowerPoint, OneDrive, Outlook, Skype and so on provided by Microsoft's Office 365. The content provided by the Office 365 service may also be accessed through a browser instead of the client applications. Both the browser and the client applications may be referred to as user agent. Content of each usage activity data includes a user agent string content which provides information about the user agent. The usage activity data from various client computing devices may be stored at the server computing device such as an Office 365 server as log data.

Figure 3:
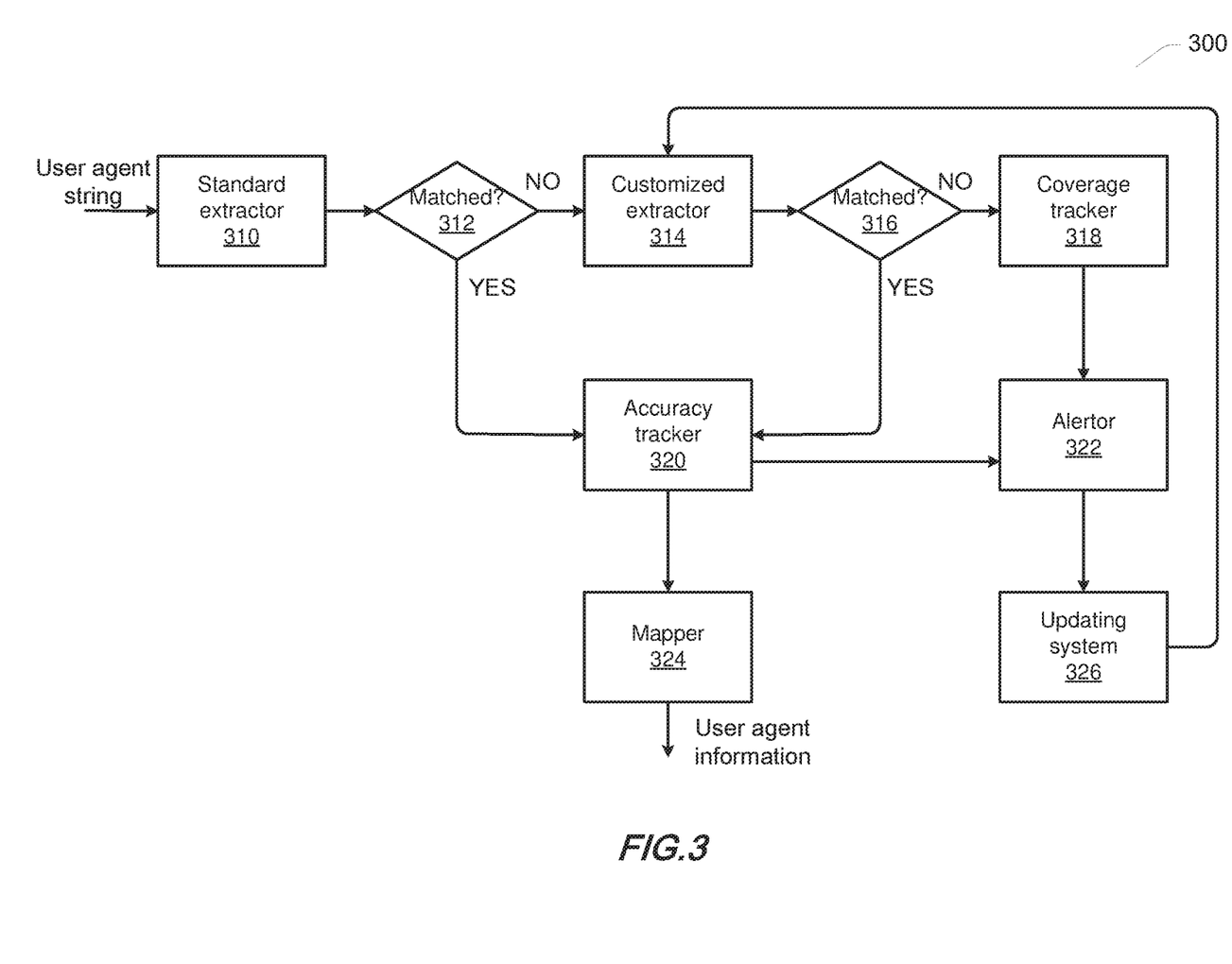
FIG. 3 illustrates an exemplary framework of a parsing system according to an embodiment.

FIG. 3 illustrates an exemplary framework of a parser system 300 according to an embodiment.

A user agent string is processed at a standard information extractor 310. The standard information extractor 310 may be an information extractor following common web browser user agent string formats, and thus may extract information from user agent strings following common web browser user agent string formats.

If the user agent string cannot be matched or recognized at the standard extractor 310, as indicated by the NO branch at 312, the user agent string is processed at a customized extractor 314. For example, if the user agent string is sent from a client application rather than a web browser, it's possible that the standard extractor 310 cannot recognize the user agent string because the pattern or format of the user agent string does not conform to the common web browser user agent string formats.

The customized extractor 314 includes user agent string patterns customized for one or more client applications. For example, the client applications may be above mentioned Word, Excel, PowerPoint, OneDrive, Outlook, Skype and so on provided by Microsoft's Office 365, may be media players for displaying multimedia online, and so on. In an implementation, the user agent string patterns may be described by regular expressions, which may be implemented by programming language, such as XML (extensible markup language), YAML (Yet Another Multicolumn Layout) or the like. The customized extractor 314 may recognize a user agent string by comparing the user agent string with the customized regular expressions, and thus obtain information from the user agent string.

An exemplary regular expression of a user agent string pattern customized for client applications is shown as below. regex:'^(?<AppName>(MicrosoftOffice)?(OneNote|Excel-|PowerPoint|Word|Yammer|Lens))\/
((?<AppMajorVersionPrefered>\d+)(\.
(?<AppMinorVersion>\d+))?((\.IV)
(?<AppBuildVersion>\d+))?((\.IV)
(?<AppBuildRevision>\d+))?(\.\d+)*)?\
((?<OSName>iOS|MacOS|Android|Windows)\/
(?<OSMajorVersion>\d+)(\.(?<OSMinorVersion>\d+))?(\.
(?<OSPatchVersion>\d+))?(\.\d+)*;(?<DeviceClass>[a-zA-Z]+).*;((\w|\-)+);.*;(?<DeviceManufacturer>.*)\/
(?<DeviceModel>([a-zA-Z0-9]|I-I_I\.)+).*\)(&.*)?$'.

Where the "regex" refers to "regular expression" which describes the customized patterns for the specific client applications such as OneNote, Excel, PowerPoint, Word, Yammer, Lens. It should be appreciated that the regular expression of the patterns is illustrated for sake of understanding without any suggestion of limiting the scope of the disclosure. The patterns may be implemented in various applicable manners, and the regular expressions may be in various formats if implemented with different programming languages. Although only one pattern is illustrated, there may be multiple patterns customized for the client applications.

In this example, if the customized extractor recognizes that the format of the user agent string matches one of the patterns, the user agent information may be extracted from the user agent string at the customized extractor 314.

An example of the user agent string may be "Microsoft Office OneNote 15.1.42 Windows NT 6.1", and the extracted user agent information include the application's name "Microsoft Office OneNote", the application's version "15.1", the OS's name "Windows NT", and the OS's version "6.1".

Another example of the user agent string may be "Microsoft Office OneNote Macintosh Mac OS X 10.4", and the extracted user agent information include the application's name "Microsoft Office OneNote", the OS's name "Mac OS", and the OS's version "10.4".

Another example of the user agent string may be "OUTLOOK.EXE 14.0.38 Windows NT 10.0", and the extracted user agent information include the application's name "OUTLOOK.EXE", the application's version "14.0", the OS's name "Windows NT", and the OS's version "10.0".

If the user agent string is not recognized or matched at the customized extractor 314, as indicated by the NO branch at 316, the unrecognized user agent strings may be statistically counted at the coverage tracker 318. In other words, the coverage tracker 318 may monitor the number of the unrecognized user agent strings and compute the coverage percentage of the parsing system. Although not illustrated in the Figure, the coverage tracker 318 may also monitor the number of the recognized user agent strings and/or the number of overall user agent strings input into the parsing system 300.

The coverage percentage may be denoted by the percentage of the number of recognized user agent strings to the number of all user agent strings input into the parsing system 300. The un-coverage percentage may be denoted by the percentage of the number of unrecognized user agent strings to the number of all user agent strings input into the parsing system 300. It should be appreciated that the coverage percentage and the un-coverage percentage are equivalent to each other and may be used interchangeably.

If the user agent string is recognized or matched either at the standard extractor 310 or at the customized extractor 314, as indicated by the YES branch at 312 or 316, the recognized user agent information may be evaluated at the accuracy tracker 320, in order to calculate the accuracy percentage of correctly recognized user agent strings over a number of recognized user agent strings.

In an implementation, expected user agent information may be manually obtained from a number of user agent strings such as five hundreds user agent strings, then at the accuracy tracker 320, the expected user agent information may be compared with the user agent information obtained at the extractor 310 or 314 in order to identify correctly recognized user agent strings and incorrectly recognized user agent strings. The accuracy percentage may be obtained as the ratio of the number of correctly recognized user agent strings to the number of recognized user agent strings. The inaccuracy percentage may be denoted by the percentage of the number of incorrectly recognized user agent strings to the number of recognized user agent strings. It should be appreciated that the accuracy percentage and the inaccuracy percentage are equivalent to each other and may be used interchangeably.

An alerting may be output at an alertor 322 based on the coverage percentage and/or the accuracy percentage. As an example, if the un-coverage percentage is more than a threshold such as 5%, an alerting may be output. As another example, if the inaccuracy percentage is more than a threshold such as 5%, an alerting may be output. As another example, if the sum of the un-coverage percentage and the inaccuracy percentage is more than a threshold such as 5%, an alerting may be output. The alerting resulted from relative high un-coverage percentage and/or the inaccuracy percentage indicates that there are user agent strings that cannot be handled by the customized extractor, and thus the unrecognized and/or incorrectly recognized user agent strings may be used at the updating system 326 to update the user agent string patterns for the customized extractor 314.

The information extracted at extractor 310 or 314 include application information, operating system (OS) information, device information or the like. The mapper 324 maps the extracted information to predefined information, which is related to the extracted information but is not contained in the user agent string. The information extracted from the user agent string and the corresponding predefined information are output by the parsing system 300 as the user agent information.

Figure 4:
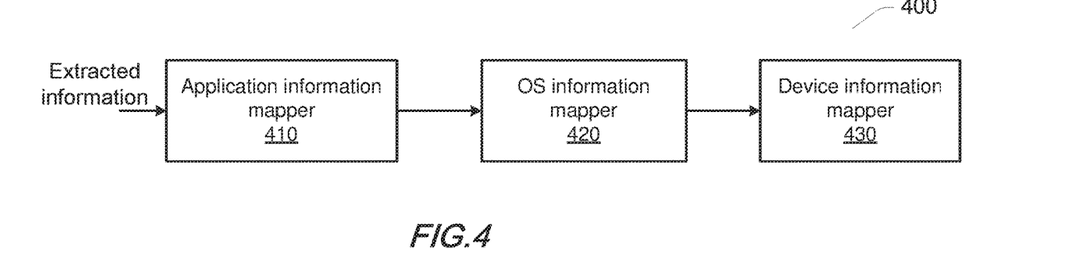
FIG. 4 illustrates an exemplary mapper according to an embodiment.

FIG. 4 illustrates an exemplary structure of a mapper 400 according to an embodiment.

The mapper 400 is an example of the mapper 324. The mapper 400 includes an application information mapper 410, an OS information mapper 420 and a device information mapper 430. It should be appreciated that the mapper 400 may also include other mappers for other types of user agent information.

The extracted information such as at least one of application information, OS information and device information may be mapped to predefined information through the application information mapper 410, OS information mapper 420 and device information mapper 430. The predefined information provides a supplementation for the extracted information and may be helpful for the potential further process with regard to the user agent information. In an implementation, the application information mapper 410, OS information mapper 420 and device information mapper 430 may be implemented with unified mapping rules, which may be described with regular expressions. Examples of the mapping rules are as follows:

OS Mappings:
   regex: '(W|w)indows (NT)?6.1
   OSFriendlyName: 'Windows 7
   DeviceModel: 'PC'
   DeviceClass: 'PC'
   DeviceManufacturer: 'PC'
   regex: '(W|w)indows (NT)?6.2'
   OSFriendlyName: 'Windows 8'
   DeviceModel: 'PC'
   DeviceClass: 'PC'
   DeviceManufacturer: 'PC'
   regex: '(W|w)indows (NT)?10.0'
   OSFriendlyName: 'Windows 10'
   DeviceModel: 'PC'
   DeviceClass: 'PC'
   DeviceManufacturer: 'PC'
   regex: '^(?i)(?!.*ios).*android(?!.*ios).*$'
   OSFriendlyName: 'Android'
   DeviceModel: 'Android'
   DeviceClass: 'smartphone'
   DeviceManufacturer: 'smartphone'
   regex: '(M|m)ac(?I_I\+)OS'
   OSName: 'Mac OS'
   OSFriendlyName: 'Mac OS X'
   DeviceModel: 'PC'
   DeviceClass: 'PC'
   DeviceManufacturer: 'Apple'
Application Mapping:
   regex: '(?i)WindowsMail'
   AppFriendlyName: 'Windows 8 Desktop Client'
   DeviceModel: 'PC'
   DeviceClass: 'PC'
   DeviceManufacturer: 'Microsoft'
   OSName: 'Windows 8.*'
   regex: '(?i)Windows.*;.*Outlook15.*'
   AppFriendlyName: 'Outlook 2013 (E15)'
   regex: '(Outlook|OUTLOOK|outlook)(\.((EXE)|(exe)|(Exe)))?'
   AppFriendlyName: 'Outlook'
   DeviceClass: 'PC'
   DeviceModel: 'PC'
   OSName: 'Windows'
   regex: 'OUTLOOK(?STS)'
   AppFriendlyName: 'Microsoft Office Outlook'
   regex: '(?<AppFriendlyName>Excel|PowerPoint|Word|OneNote);iOS'
   AppFriendlyName: 'AppFriendlyName iOS App'
   regex: '(?<AppFriendlyName>Excel|PowerPoint|Word|OneNote);(OMDroid|Android)'
   AppFriendlyName: 'AppFriendlyName Android App'
Device Mappings:
   regex: '^\d{4}[a-zA-Z]?'
   DeviceClass: 'smartphone'
   DeviceManufacturer: 'smartphone'
   regex: '((iPad|iPod).*)'
   DeviceClass: 'tablet'
   DeviceManufacturer: 'Apple'
   regex: 'iPhone.*'
   DeviceClass: 'smartphone'
   DeviceManufacturer: 'Apple'
   regex: '((Mac|Macmini|iMac|MacBook|MacPro|Macintosh).*)'
   DeviceClass: 'PC'
   DeviceManufacturer: 'Apple'
   regex: 'Nokia_XL?'
   DeviceClass: 'smartphone'
   DeviceManufacturer: 'Nokia'

The "regex" in the above mapping rules refers to "regular expression" which describes the patterns for the extracted information to be mapped. For the OS information mapping, taking an extracted OS information "windows NT 6.1" as an example, the predefined information "OSFriendlyName: Windows 7, DeviceModel: 'PC', DeviceClass: 'PC', DeviceManufacturer: 'PC'" may be obtained through the mapping. For the application information mapping, taking an extracted application information "windowsMail" as an example, the predefined information "AppFriendlyName: 'Windows 8 Desktop Client', DeviceModel: 'PC', DeviceClass: 'PC', DeviceManufacturer: 'Microsoft', OSName: 'Windows 8.*'" may be obtained through the mapping. For the device information mapping, taking an extracted device information "Macmini" as an example, the predefined information "DeviceClass: 'PC', DeviceManufacturer: 'Apple'" may be obtained through the mapping.

The mapper 400 not only provides the predefined supplementary information corresponding to the extracted information, but also provides a unified format for outputting the parsing result. The unified format may be helpful for the potential further process of the user agent information. Taking the above mentioned user agent strings "Microsoft Office OneNote 15.1.42 Windows NT 6.1", "Microsoft Office OneNote Macintosh Mac OS X 10.4", "OUTLOOK.EXE 14.0.38 Windows NT 10.0" as examples, the output of the parsing result in the unified format is shown in the following table 1.

TABLE 1

| UserAgentString | ClientAppInfo | ClientOSInfo | ClientDeviceInfo |
|---|---|---|---|
| Microsoft Office OneNote 15.1.42 Windows NT 6.1 | App Name: Microsoft Office OneNote App Friendly Name: Microsoft Office OneNote App Major Version: 15 App Minor Version: 1 | OsName: Window NT OsFriendlyName: Windows 7 Os Major Version: 6 Os Minor Version: 1 | DeviceModel: PC DeviceClass: PC DeviceManufacturer: PC |
| Microsoft Office OneNote Macintosh Mac OS X 10.4 | App Name: Microsoft Office OneNote: ios App Friendly Name: Microsoft Office OneNote iOS App | OsName: Mac OS Os Major Version: 10 Os Minor Version: 4 | DeviceModel: PC DeviceClass: PC DeviceManufacturer: Apple |
| OUTLOOK.EXE 14.0.38 Windows NT 10.0 | App Name: OUTLOOK.EXE App Friendly Name: Microsoft Office Outlook | OsName: Window NT OsFriendlyName: Windows 10 Os Major Version: 10 Os Minor Version: 0 | DeviceModel: PC DeviceClass: PC DeviceManufacturer: PC |

It should be appreciated that table 1 is just used to illustrate the unified parsing result output, but the parsing result illustrated in table 1 is not necessarily output in the format of table, any suitable format may be used to provide the extracted information and the predefined information as the parsing result.

Although the parsing result illustrated in table 1 shows that the client application information only includes application related information, the client OS information only includes OS related information and the client device information only includes device related information, the disclosure is not limited to this exemplary parsing result. For example, as illustrated in the above exemplary mapping rules, the client OS information may also include client device information since the OS is implemented at the client device, the client application information may also include client device information and client OS information since the application is implemented at the client device and the OS.

In an implementation, the client device information included in the output client OS information may be predefined information, and the client device information and/or OS information included in the output client application information may be predefined information. In another implementation, the client device information included in the output client OS information may be information extracted from the user agent string, and the client device information and/or OS information included in the output client application information may be information extracted from the user agent string. In another implementation, the client device information included in the output client OS information may be combination of predefined information and information extracted from the user agent string, and the client device information and/or OS information included in the output client application information may be combination of predefined information and information extracted from the user agent string.

An example of the mapping result obtained based on the mapping rules shown in the following table 2, in which the output OS information includes device information, and the output application information includes OS information and device information.

TABLE 2

| UserAgentString | ClientAppInfo | ClientOSInfo | ClientDeviceInfo |
|---|---|---|---|
| Microsoft Office OneNote 15.1.42 Windows NT 6.1 | App Name: Microsoft Office OneNote App Friendly Name: Microsoft Office OneNote App Major Version: 15 App Minor Version: 1 OsName: Window NT OsFriendlyName: Windows 7 DeviceModel: PC DeviceClass: PC DeviceManufacturer: PC | OsName: Window NT OsFriendlyName: Windows 7 Os Major Version: 6 Os Minor Version: 1 DeviceModel: PC DeviceClass: PC DeviceManufacturer: PC | DeviceModel: PC DeviceClass: PC DeviceManufacturer: PC |
| Microsoft Office OneNote Macintosh Mac OS X 10.4 | App Name: Microsoft Office OneNote: ios App Friendly Name: Microsoft Office OneNote iOS App OsName: Mac OS DeviceModel: PC DeviceClass: PC DeviceManufacturer: Apple | OsName: Mac OS Os Major Version: 10 Os Minor Version: 4 DeviceModel: PC DeviceClass: PC DeviceManufacturer: Apple | DeviceModel: PC DeviceClass: PC DeviceManufacturer: Apple |
| OUTLOOK.EXE 14.0.38 Windows NT 10.0 | App Name: OUTLOOK.EXE App Friendly | OsName: Window NT OsFriendlyName: Windows 10 | DeviceModel: PC DeviceClass: PC DeviceManufacturer: PC |

TABLE 2-continued

| UserAgentString | ClientAppInfo | ClientOSInfo | ClientDeviceInfo |
|---|---|---|---|
| | Name: Microsoft Office Outlook<br>OsName: Window NT<br>OsFriendlyName: Windows 10<br>DeviceModel: PC<br>DeviceClass: PC<br>DeviceManufacturer: PC | Os Major Version: 10<br>Os Minor Version: 0<br>DeviceModel: PC<br>DeviceClass: PC<br>DeviceManufacturer: PC | |

Either the exemplary parsing result shown in table 1 or the exemplary parsing result shown in table 2 are in a unified format determined by the mapping rules and include supplementary information in addition to information contained or extracted in the user agent strings.

Figure 5:
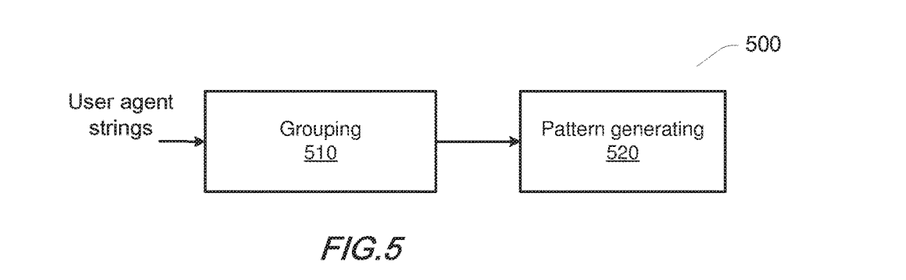
FIG. 5 illustrates an exemplary framework for updating user agent string patterns according to an embodiment.

FIG. 5 illustrates an exemplary framework for updating the customized extractor according to an embodiment.

In an implementation, the updating of the customized extractor may be performed in response to the alerting output by the alertor 322. The unrecognized and/or inaccurately recognized user agent strings represent new user agent string formats that are not defined in the customized extractor, and thus may be used to generate the new user agent string patterns.

The unrecognized and/or inaccurately recognized user agent strings are grouped at the grouping unit 510. In an example, repetitive user agent strings are identified and grouped into one group, and also the number of the repetitive user agent strings may be counted. In another example, the grouping may be implemented based on a distance measure between the user agent strings. The distance measure may be an Edit distance, also referred to as Levenshtein distance, between user agent strings. User agent strings having an Edit distance smaller than a threshold may be grouped into one group. As the user agent strings in one group are similar to each other and are likely to be represented by a same user agent string pattern, the workload for generating the new user agent string patterns may be alleviated significantly.

User agent string patterns may be generated based on the user agent string groups at the pattern generating stage 520. In an implementation, the user agent string patterns may be generated manually based on the grouped user agent strings. In another implementation, the user agent patterns may be generated automatically through an analyzing tool based on the grouped user agent strings. The user agent string pattern may be described with regular expression by using programming language such as YAML. In this way, the customized information extractor may be updated conveniently by adding new patterns in response to the above discussed alerting.

In an implementation, the updating of user agent string patterns may be performed iteratively until a targeted coverage percentage and/or accuracy percentage is achieved. Particularly, the unrecognized and/or inaccurately recognized user agent strings are input into the parsing system 300 after the updating of the customized extractor 314, and the coverage percentage and/or accuracy percentage may be derived at the coverage tracker 318 and accuracy tracker 320. If the he coverage percentage and/or accuracy percentage does not meet the targeted value, the updating process as illustrated in FIG. 5 may be performed to update the customized extractor 314. The two processes illustrated in FIGS. 3 and 5 may be performed iteratively based on the unrecognized and/or inaccurately recognized user agent strings until the targeted coverage percentage and/or accuracy percentage is achieved.

Figure 6:
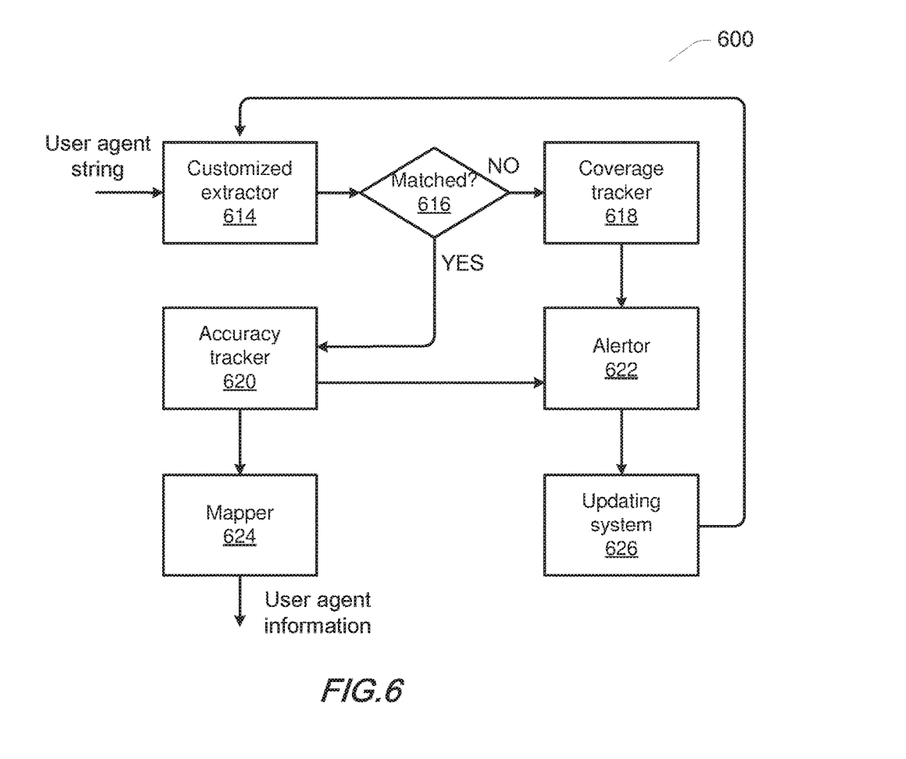
FIG. 6 illustrates an exemplary framework of a parsing system according to an embodiment.

FIG. 6 illustrates an exemplary framework of a parser system 600 according to an embodiment.

In this embodiment, the standard extractor 310 illustrated in FIG. 3 is incorporated in the customized extractor 614. In an implementation, the user agent string patterns corresponding to the common web browser user agent string formats are described with regular expressions, and are combined with the user agent string patterns customized for one or more client applications not following the common web browser user agent string formats. In this way, the customized extractor 614 is able to recognize user agent strings following the common web browser user agent string formats and user agent strings following the customized user agent string patterns.

In some implementations, some user agent strings sent from some web browsers may not conform to the common web browser user agent string formats either. User agent string patterns may also be customized for such web browsers based on the unrecognized user agent strings.

The coverage tracker 618, accuracy tracker 620, alertor 622, mapper 624 and updating system 626 are similar to the coverage tracker 318, accuracy tracker 320, alertor 322, mapper 324 and updating system 326, therefore detailed description of these units is not provided for sake of simplicity.

Figure 7:
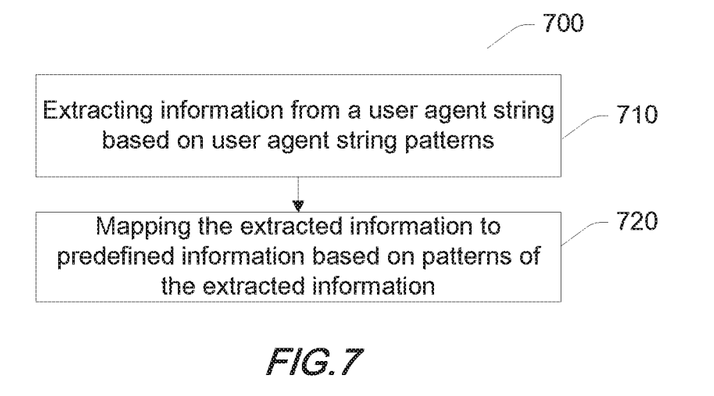
FIG. 7 illustrates an exemplary process for parsing a user agent string according to an embodiment.

FIG. 7 illustrates an exemplary process 700 for parsing a user agent string according to an embodiment.

At 710, information is extracted from a user agent string based on user agent string patterns. The user agent string patterns may be customized for at least one application. At 720, the extracted information is mapped to predefined information based on patterns of the extracted information.

In an implementation, the user agent string patterns are defined with regular expressions. In an implementation, the patterns of the extracted information are defined with regular expressions.

In an implementation, the extracted information includes at least one of application information, operating system information and device information.

In an implementation, the predefined information includes at least one of device model information, device class information and device manufacturer information corresponding to the extracted device information.

In an implementation, the predefined information includes at least one of operating system friendly name information, device model information, device class information and device manufacturer information corresponding to the extracted operating system information.

In an implementation, the predefined information includes at least one of application friendly name information, operating system name information, operating system friendly name information, device model information, device class information and device manufacturer information corresponding to the extracted application information.

In an implementation, a coverage percentage of recognized user agent strings over a number of user agent strings is tracked. The coverage percentage of recognized user agent strings over a number of user agent strings is equivalent to a un-coverage percentage of unrecognized user agent strings over a number of user agent strings.

In an implementation, an accuracy percentage of accurately recognized user agent strings over a number of recognized user agent strings is tracked. The accuracy percentage of accurately recognized user agent strings over a number of recognized user agent strings is equivalent to an inaccuracy percentage of inaccurately recognized user agent strings over a number of recognized user agent strings.

In an implementation, alerting is output when the coverage percentage and/or the accuracy percentage is less than a threshold or equivalently the un-coverage percentage and/or the inaccuracy percentage is more than a threshold.

In an implementation, the user agent string patterns are updated based on unrecognized user agent strings and/or inaccurately recognized user agent strings.

In an implementation, the unrecognized user agent strings and/or inaccurately recognized user agent strings are parsed based on the updated user agent string patterns, the coverage percentage and/or the accuracy percentage for the unrecognized user agent strings and/or inaccurately recognized user agent strings are tracked, and the updated user agent string patterns are further updated if the coverage percentage and/or the accuracy percentage for the unrecognized user agent strings and/or inaccurately recognized user agent strings is less than a threshold.

Figure 8:
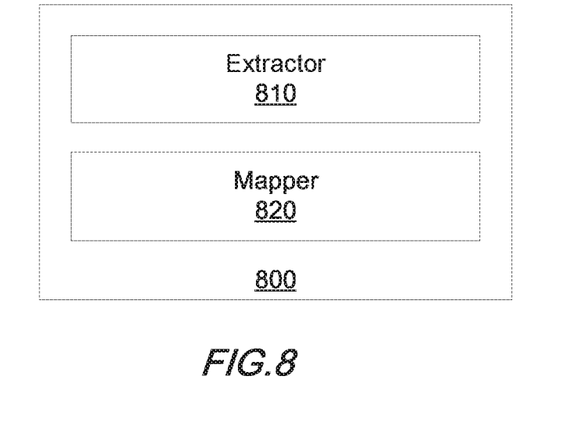
FIG. 8 illustrates an exemplary apparatus for parsing a user agent string according to an embodiment.

FIG. 8 illustrates a parser 800 for paring a user agent string according to an embodiment. The parser 800 comprises an extractor 810 for extracting information from a user agent string based on user agent string patterns. The user agent string patterns may be customized for at least one application. The parser 800 comprises a mapper 820 for mapping the extracted information to predefined information based on patterns of the extracted information. In an implementation, the extractor 810 may represent the combination of standard extractor 310 and customized extractor 314. In an implementation, the extractor 810 may represent the customized extractor 314. In an implementation, the extractor 810 may represent the customized extractor 614.

In an implementation, the user agent string patterns are defined with regular expressions, and the patterns of the extracted information are defined with regular expressions.

In an implementation, the extracted information includes at least one of application information, operating system information and device information.

In an implementation, the predefined information includes at least one of device class information and device manufacturer information corresponding to the extracted device information.

In an implementation, the predefined information includes at least one of operating system friendly name information, device model information, device class information and device manufacturer information corresponding to the extracted operating system information.

In an implementation, the predefined information includes at least one of application friendly name information, operating system name information, operating system friendly name information, device model information, device class information and device manufacturer information corresponding to the extracted application information.

In an implementation, the parser 800 comprises a coverage tracker for tracking a coverage percentage of recognized user agent strings over a number of user agent strings.

In an implementation, the parser 800 comprises an accuracy tracker for tracking an accuracy percentage of accurately recognized user agent strings over a number of recognized user agent strings.

In an implementation, an alerting is output when the coverage percentage and/or the accuracy percentage is less than a threshold.

In an implementation, the user agent string patterns are updated based on unrecognized user agent strings and/or inaccurately recognized user agent strings.

It should be appreciated that the apparatus 800 may also comprise any other modules configured for performing any operations according to the various embodiments as mentioned above in connection with FIGS. 1-7.

Figure 9:
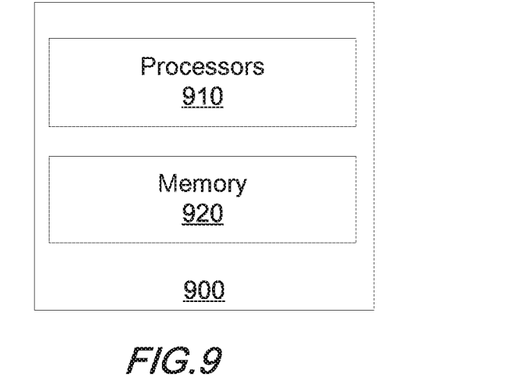
FIG. 9 illustrates an exemplary computing system according to an embodiment.

FIG. 9 illustrates an exemplary computing system according to an embodiment.

The system 900 may comprise one or more processors 910. The system 900 may further comprise a memory 920 that is connected with the one or more processors 910.

The memory 920 may store computer-executable instructions that, when executed, cause the one or more processors 910 to extract information from a user agent string based on user agent string patterns, and map the extracted information to predefined information based on patterns of the extracted information.

It should be appreciated that the computer-executable instructions, when executed, cause the one or more processors 910 to perform any operations of the processes according to the embodiments as mentioned above in connection with FIGS. 1-8.

The embodiments of the present disclosure may be embodied in a non-transitory computer-readable medium. The non-transitory computer-readable medium may comprise instructions that, when executed, cause one or more processors to perform any operations of the processes according to the embodiments as mentioned above.

It should be appreciated that all the operations in the processes described above are merely exemplary, and the present disclosure is not limited to any operations in the processes or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

The invention claimed is:

1. A method for parsing a user agent string, comprising:
    attempting to extract, by a first extractor, information from a user agent string based on first user agent string patterns, the first extractor configured to extract information from user agent strings generated by a web browser user agent in a first format;
    when the first extractor is not able to extract any information from the user agent string, attempting to extract, by a second extractor, information from the user agent string based on second user agent string patterns, the second extractor configured to extract information from user agent strings generated by an application user agent in a second format; and
    in response to extracting the information by the first extractor or the second extractor, mapping the extracted information to predefined information based on patterns of the extracted information.

2. The method of claim 1, wherein the user agent string patterns are defined with regular expressions, and the patterns of the extracted information are defined with regular expressions.

3. The method of claim 1 wherein the extracted information includes at least one of application information, operating system information and device information.

4. The method of claim 3, wherein the predefined information includes at least one of device model information, device class information and device manufacturer information corresponding to the extracted device information.

5. The method of claim 3, wherein the predefined information includes at least one of operating system friendly name information, device model information, device class information and device manufacturer information corresponding to the extracted operating system information.

6. The method of claim 3, wherein the predefined information includes at least one of application friendly name information, operating system name information, operating system friendly name information, device model information, device class information and device manufacturer information corresponding to the extracted application information.

7. The method of claim 1, further comprising
    tracking a coverage percentage of recognized user agent strings over a number of user agent strings; and/or
    tracking an accuracy percentage of accurately recognized user agent strings over a number of recognized user agent strings.

8. The method of claim 7, further comprising:
    alerting when the coverage percentage and/or the accuracy percentage is less than a threshold.

9. The method of claim 8, further comprising:
    updating the user agent string patterns based on unrecognized user agent strings and/or inaccurately recognized user agent strings.

10. The method of claim 9, further comprising:
    parsing the unrecognized user agent strings and/or inaccurately recognized user agent strings based on the updated user agent string patterns;
    tracking the coverage percentage and/or the accuracy percentage for the unrecognized user agent strings and/or inaccurately recognized user agent strings; and
    updating the updated user agent string patterns if the coverage percentage and/or the accuracy percentage for the unrecognized user agent strings and/or inaccurately recognized user agent strings is less than a threshold.

11. A parser, comprising:
    a first extractor for extracting information from a first type of user agent string generated by a web browser user agent in a first format based on first user agent string patterns;
    a second extractor for extracting information from a second type of user agent string generated by an application user agent in a second format based on second user agent string patterns;
    a mapper for mapping the extracted information to predefined information based on patterns of the extracted information, wherein:
    in response to receiving a user agent,
        the first extractor attempts to extract information from the user agent string,
        when the first extractor is not able to extract any information from the user agent string, the second extractor attempts to extract information from the user agent string, and
        in response to extracting the information by the first extractor or the second extractor, the mapper maps the extracted information to the predefined information based on patterns of the extracted information.

12. The parser of claim 11, wherein the user agent string patterns are defined with regular expressions, and the patterns of the extracted information are defined with regular expressions.

13. The parser of claim 12, wherein the extracted information includes at least one of application information, operating system information and device information.

14. The parser of claim 13, wherein the predefined information includes at least one of device model information, device class information and device manufacturer information corresponding to the extracted device information.

15. The parser of claim 13, wherein the predefined information includes at least one of operating system friendly name information, device model information, device class information and device manufacturer information corresponding to the extracted operating system information.

16. The parser of claim 13, wherein the predefined information includes at least one of application friendly name information, operating system name information, operating system friendly name information, device model information, device class information and device manufacturer information corresponding to the extracted application information.

17. The parser of claim 11, further comprising
a coverage tracker for tracking a coverage percentage of recognized user agent strings over a number of user agent strings; and/or
an accuracy tracker for tracking an accuracy percentage of accurately recognized user agent strings over a number of recognized user agent strings.

18. The parser of claim 17, further comprising
an alertor for alerting when the coverage percentage and/or the accuracy percentage is less than a threshold.

19. The parser of claim 18, wherein the user agent string patterns are updated based on unrecognized user agent strings and/or inaccurately recognized user agent strings.

20. A computer system, comprising:
one or more processors; and
a memory storing computer-executable instructions that, when executed, cause the one or more processors to:
attempt to extract, by a first extractor, information from a user agent string based on first user agent string patterns, the first extractor configured to extract information from user agent strings generated by a web browser user agent in a first format;
when the first extractor is not able to extract any information from the user agent string, attempt to extract, by a second extractor, information from the user agent string based on second user agent string patterns, the second extractor configured to extract information from user agent strings generated by an application user agent in a second format; and
in response to extracting the information by the first extractor or the second extractor, map the extracted information to predefined information based on patterns of the extracted information.

* * * * *